UNITED STATES PATENT OFFICE.

NICOLA ALBERTO BARBIERI, OF ROME, ITALY.

PHYSIOLOGICAL FERTILIZER FOR SEEDS AND PLANTS.

1,282,170.   Specification of Letters Patent.   Patented Oct. 22, 1918.

No Drawing.   Application filed March 11, 1918.   Serial No. 221,713.

*To all whom it may concern:*

Be it known that I, NICOLA ALBERTO BARBIERI, doctor of medicine, a subject of the King of Italy, and residing at Rome, Italy, (whose post-office address is 47 Via Firenze,) have invented certain new and useful Improvements in Physiological Fertilizers for Seeds and Plants, of which the following is a specification.

Every plant is built up of two distinct parts. The first, the inorganic part, is composed of mineral matters, the other the organic part of biological principles. Until now the chemists have identified the mineral matter of vegetation or plants only after a process of incineration, and they have determined from the ashes the amount of acids and of bases. In the ashes the chemists have established the reciprocal combination of acids, with the bases (salts) by calculation only.

It is not difficult to prove this method is inexact. The high temperature which is necessary to resolve the organic matter into white ashes certainly changes and transforms the mineral matters of vegetables. The white ashes which remain after all organic parts of plants have been consumed merely prove the quantity of mineral matters which was before contained in them. The acids and bases which are in the plants have now also been discovered in the soil. From this discovery the principle of restitution is established, that is to say these mineral matters which the plants have extracted from the soil, must be returned to it.

But the simple presence in the ashes and in the soil of the same acids and bases cannot furnish any absolute proof of their reciprocal combination (salts).

After a study of more than 20 years I have been able to establish the fact that the mineral part of vegetables consists only of soluble and insoluble salts which are preëxistent in them. The soluble salts which usually are the neutral sulfate of potassium ($K_2SO_4$), the acid phosphate of potassium ($KH_2PO_4$) and sometimes the alkali metal chlorids, are separated from vegetable structures by different neutral solvents either hot or cold. In the residue which is insoluble in all known neutral solvents one can identify by the method of incineration the insoluble salts which are: tri-calcium phosphate ($Ca_3(PO_4)_2$), magnesium phosphate, calcium sulfate and calcium carbonate. The same insoluble residue contains traces of iron, traces of manganese and often a little quantity of silicon.

A slight modification of the method of incineration permits one to weigh more exactly the mineral residue of agricultural seeds. The weight of ashes in different classes of agricultural seeds generally ranges from 2 to 4 per cent. After having identified the soluble and insoluble salts and after having weighed their ashes for the sole purpose of ascertaining the exact percentage of mineral matters of the plants, I have succeeded in establishing the principle of physiological cultivation of every agricultural plant. According to this principle one must apply directly to each hundred grams of seed which is cultivated, 10, 15 or 20 grams of physiological fertilizing mixture. But the quantities applied will depend upon the percentage of ashes.

For example a quintal of corn sown in one hectare of land by hand or by machine can produce, on an average 15 quintals. These 15 quintals of corn will give 26 kilograms of ashes, and this weight represents the total quantity of mineral matters which a quintal of corn has extracted from one hectare to produce 15 quintals. If then, before sowing the corn, we apply 15 kilograms of physiological fertilizing mixture to one quintal, we invest this corn immediately with the potentiality of producing at the harvest a result in excess of that of a similar quantity of corn sown in the same manner and under the same conditions, but without any fertilizer.

In practice the physiological fertilizing mixture applied to one thousand grams of dry agricultural seeds is composed of from thirty to thirty-five grams of neutral sulfate of potassium, from twenty to twenty-five grams of acid phosphate of potassium, from twenty to thirty-five grams of phosphate of calcium ($Ca_3(PO_4)_2$), from twenty to twenty-five grams of phosphate of magnesium, from twenty to twenty-five grams of sulfate of calcium, from five to ten grams of calcium carbonate, from half a gram to one gram of sulfate of manganese, and from one to three grams of silica. The quantities of the ingredients within the limits specified above are used in making the physiological fertilizer. It is necessary to completely mix the ingredients.

*Examples.*

I. Concerning the dressing of small seeds (cereal seeds, flax seeds and the like).

After watering the seeds, now apply for example to a quintal of corn 12, 15 or 20 kilograms (according to the case) of physiological fertilizing mixture. Then one stirs the mass until all the seeds are uniformly coated with the mixture. The seeds are immediately sown by hand or machine, preferably the latter.

II. Concerning seeds of ordinary size such as beans, chestnuts and the like.

On each bean, or on each chestnut put in the soil, from 2 to 5 grams of physiological fertilizing mixture are spread.

III. Concerning large seeds such as bulbs of hyacinth, tubers of potatoes and the like.

On each bulb or tuber which is put in the soil, from 6 to 10 grams of physiological fertilizing mixture are spread.

Owing to the help that the physiological fertilizing mixture brings to all agricultural seeds, one remarks that the germinating potentiality increases, that the plants bear 5 or 6 days sooner, that the roots are more extended, that the leaves are larger and greener, and the stalks stronger. The blossoming takes place 10 or 12 days sooner. The harvest is augmented in quantity and at the same time the quality is higher.

To assist the development of young plants, each time that they are transplanted in new soil, it is necessary to apply to the holes intended for their reception from 3 to 10 grams of physiological fertilizing mixture.

In resumé:

1. The physiological cultivation concerns only the mineral part of agricultural plants.

2. The mineral cultivation of the soil employs a large diffusive quantity of mineral matters for each square meter, but the physiological cultivation of agricultural plants seeks to substitute for this wasteful inadequate method a direct and localized mineralization of seeds by applying small quantity of physiological fertilizing mixture more locally to the seeds.

3. The physiological cultivation demands that one should apply, at same time, to the seeds and to the plants all mineral salts which previously existed in them.

In one word: It is necessary to apply to the earth organic manures, but one must mineralize the seeds with physiological fertilizers composed of natural salts of vegetables.

I claim:

An improved fertilizer for seeds or plants consisting of neutral sulfate of potassium; acid phosphate of potassium; phosphate of calcium; phosphate of magnesium; sulfate of calcium; silica; calcium carbonate; and sulfate of manganese.

In testimony whereof I have hereunto signed my name in the presence of two witnesses.

NICOLA ALBERTO BARBIERI.

Witnesses:
GIOVANNI BORTOLUZZI,
GIOVANNI VETTURRNI.